United States Patent
Angell et al.

(10) Patent No.: US 6,513,003 B1
(45) Date of Patent: Jan. 28, 2003

(54) SYSTEM AND METHOD FOR INTEGRATED DELIVERY OF MEDIA AND SYNCHRONIZED TRANSCRIPTION

(75) Inventors: Philip S. Angell, Annapolis, MD (US); Mohammad A. Haque, Hyattsville, MD (US); Jason D. Levine, Washington, DC (US); Frank Gary Bivings, Jr., Washington, DC (US); Matthew B. Benson, Washington, DC (US)

(73) Assignee: Fair Disclosure Financial Network, Inc., Watertown, MA (US)

( * ) Notice: Subject to any disclaimer, the term of this patent is extended or adjusted under 35 U.S.C. 154(b) by 0 days.

(21) Appl. No.: 09/498,233

(22) Filed: Feb. 3, 2000

(51) Int. Cl.[7] .............................................. G10L 15/26
(52) U.S. Cl. ..................................... 704/235; 704/270
(58) Field of Search ............................... 704/270, 272, 704/275, 251, 231, 500, 507, 242, 245, 235, 265, 277

(56) References Cited

U.S. PATENT DOCUMENTS

| | | | |
|---|---|---|---|
| 4,041,467 A | 8/1977 | Cota et al. | 364/900 |
| 4,430,726 A | 2/1984 | Kasday | 364/900 |
| 4,866,770 A | 9/1989 | Seth-Smith et al. | 380/20 |
| 4,924,387 A | 5/1990 | Jeppesen | 364/409 |
| 4,965,440 A | 10/1990 | Hasegawa | 235/487 |
| 5,031,113 A | 7/1991 | Hollerbauer | 364/513.5 |
| 5,249,050 A | 9/1993 | Zato | 358/147 |

(List continued on next page.)

FOREIGN PATENT DOCUMENTS

| | | |
|---|---|---|
| WO | WO 96/24840 | 9/1996 |
| WO | WO 98/34217 | 8/1998 |

OTHER PUBLICATIONS

Proceedings of the Speech Recognition Workshop. Maison et al., "Audio visula speaker recognition for video broadcast news: some fusion techniques". Pp. 161–167. 1999.*

ICASSP–97. 1997 IEEE International Conference on Acoustics, Speech and Signal Processing. ROy et al., "Speaker Identification Based Text to Audio Alignment for an Audio Retrieval System". Pp. 1099–1102. Apr. 1997.*

(List continued on next page.)

*Primary Examiner*—Richemond Dorvil
(74) *Attorney, Agent, or Firm*—Testa, Hurwitz & Thibeault, LLP (57) ABSTRACT

A system for the capture of audio, video and other media from news and other events combines digitized delivery of those media with accompanying high-accuracy textual streams, synchronized with the content. Governmental, corporate and other group events may be captured using microphones, video camera and other equipment, whose output is digitized and sent to a transcription facility containing speech recognition workstations. Human transcription agents may assist in the initial conversion to text data, and human editorial agents may further review the audio and textual streams contemporaneously, to make corrections, add highlights, identify foreign phrases and otherwise increase the quality of the transcription service. Subscribers to the service may access a Website or other portal to view the media and text in a real time or near-real time to the original event, and access archival versions of other events for research, editing and other purposes. The subscribers may configure their accounts to deliver the streaming content in different ways, including full content delivery and background execution which triggers on key words for pop up text, audio, video or other delivery of important portions in real time. The subscribers may set up their accounts to stream different events at different dates and times, using different keywords and other settings.

26 Claims, 4 Drawing Sheets

U.S. PATENT DOCUMENTS

| | | |
|---|---|---|
| 5,267,155 A | 11/1993 | Buchanan et al. ..... 364/419.14 |
| 5,280,430 A | 1/1994 | Woods et al. ............... 364/419 |
| 5,289,523 A | 2/1994 | Vasile et al. ................... 379/52 |
| 5,315,386 A | 5/1994 | Muramoto ................. 348/569 |
| 5,327,176 A | 7/1994 | Forler et al. ................ 348/564 |
| 5,345,270 A | 9/1994 | Saeger et al. ............... 348/435 |
| 5,347,365 A | 9/1994 | Harigai et al. .............. 348/525 |
| 5,347,632 A | 9/1994 | Filepp et al. ............... 395/200 |
| 5,369,704 A | 11/1994 | Bennett et al. ................. 380/9 |
| 5,428,400 A | 6/1995 | Landis et al. ............... 348/569 |
| 5,438,370 A | 8/1995 | Primiano et al. ........... 348/476 |
| 5,448,474 A | 9/1995 | Zamora ...................... 364/419 |
| 5,477,274 A | 12/1995 | Akiyoshi et al. ........... 348/468 |
| 5,500,920 A | 3/1996 | Kupiec ...................... 395/2.79 |
| 5,537,151 A | 7/1996 | Orr et al. .................... 348/564 |
| 5,539,920 A | 7/1996 | Menand et al. .............. 455/5.1 |
| 5,543,850 A | 8/1996 | Pratt et al. .................. 348/617 |
| 5,543,851 A | 8/1996 | Chang ........................ 348/468 |
| 5,543,852 A | 8/1996 | Yuen et al. ................. 348/478 |
| 5,563,804 A | 10/1996 | Mortensen et al. ......... 364/514 |
| 5,572,260 A | 11/1996 | Onishi et al. ............... 348/468 |
| 5,594,809 A | 1/1997 | Kopec et al. ................ 382/161 |
| 5,615,131 A | 3/1997 | Mortensen et al. ......... 364/514 |
| 5,627,594 A | 5/1997 | van Gestel ................. 348/468 |
| 5,630,060 A | 5/1997 | Tang et al. ............ 395/200.01 |
| 5,648,789 A | 7/1997 | Beadles et al. ................. 345/8 |
| 5,649,060 A | 7/1997 | Ellozy et al. .............. 395/2.87 |
| 5,689,620 A | 11/1997 | Kopec et al. .................. 395/20 |
| 5,703,655 A | 12/1997 | Corey et al. ................ 348/468 |
| 5,724,481 A | 3/1998 | Garberg et al. ............ 395/2.52 |
| 5,740,245 A | 4/1998 | Bennett et al. ................. 380/9 |
| 5,745,184 A | 4/1998 | Neal ........................... 348/468 |
| 5,758,080 A | 5/1998 | Mortensen et al. ......... 395/200 |
| 5,768,375 A | 6/1998 | Yamaguchi et al. .......... 380/10 |
| 5,799,276 A | 8/1998 | Komissarchik et al. ..... 704/251 |
| 5,801,782 A | 9/1998 | Patterson .................... 348/473 |
| 5,815,196 A | 9/1998 | Alshawi |
| 5,822,523 A | 10/1998 | Rothschild et al. ......... 395/200 |
| 5,822,528 A | 10/1998 | Amano .................. 395/200.47 |
| 5,828,836 A | 10/1998 | Westwick et al. ......... 395/200.3 |
| 5,861,883 A | 1/1999 | Cuomo et al. ............... 345/326 |
| 5,870,454 A | 2/1999 | Dahlen .................... 379/88.14 |
| 5,883,675 A | 3/1999 | Herz et al. ................... 348/465 |
| 5,883,896 A | 3/1999 | Kopec et al. ............... 382/310 |
| 5,884,256 A | 3/1999 | Bennett et al. ............. 704/235 |
| 5,884,277 A | 3/1999 | Khilsa .......................... 705/14 |
| 5,887,243 A | 3/1999 | Harvey et al. ............... 455/3.1 |
| 5,896,129 A | 4/1999 | Murphy et al. ............. 345/327 |
| 5,915,092 A | 6/1999 | Ludwig et al. ........ 395/200.34 |
| 5,949,952 A | 9/1999 | Bennett et al. ................ 386/46 |
| 5,959,687 A | 9/1999 | Dinwiddie et al. ......... 348/564 |
| 5,970,141 A | 10/1999 | Bennett et al. ................. 380/9 |
| 5,982,448 A | 11/1999 | Reyes ......................... 348/552 |
| 5,983,005 A | 11/1999 | Monteiro et al. ........... 395/200 |
| 5,996,000 A | 11/1999 | Shuster ....................... 709/201 |
| 6,005,561 A | 12/1999 | Hawkins et al. ............ 345/327 |
| 6,014,706 A | 1/2000 | Cannon et al. .............. 709/231 |
| 6,023,675 A | 2/2000 | Bennett et al. ............. 704/235 |
| 6,026,395 A | 2/2000 | Bennett et al. ................ 707/3 |
| 6,185,527 B1 * | 2/2001 | Petkovic et al. ............ 704/231 |
| 6,345,252 B1 * | 2/2002 | Beigi et al. ................. 704/251 |

OTHER PUBLICATIONS

Huangfu, J. et al., "Synchronized Captioning System Using MPEG–4 and SPHINX", 18–899 Special Topics in Signal Processing Midsemester Project Report, *Electrical and Computer Engineering*, Mar. 1998, XP002172106, [accessed May 21, 2001], 2 pages.

Witbrock, M. et al., "Speech Recognition and Information Retrieval: Experiments in Retrieving Spoken Documents", Proceedings of the Darpa Speech Recognition Workshop 1997, Feb. 1997, Virginia, XP002172107, [accessed May 21, 2001], 5 pages.

Yu, G. et al., "Identification of Speakers Engaged in Dialog", *IEEE*, New York, Apr. 1993, XP000427806, ISBN: 0–7803–0946–4, Abstract, pp. II–383–386.

* cited by examiner

SYSTEM AND METHOD FOR INTEGRATED DELIVERY OF MEDIA AND SYNCHRONIZED TRANSCRIPTION

FIELD OF THE INVENTION

The invention relates to the field of communications, and more particularly to the delivery of audio and other media broadcasts combined with high-accuracy, synchronous textual streams reflecting the dialogue in that media.

BACKGROUND OF THE INVENTION

The robust growth in demand for both media content and delivery channels has increased the need for novel types of information, news, financial and other services. The Internet and other network technologies have enabled a variety of multipoint media streams, such as news Websites containing streamable video clips, audio clips and other media combinations. One frequent type of news source is a collective meeting or proceeding, in which one or a few speakers discuss information of interest to a wide audience. Those types of settings include sessions of Congress, presidential and other news conferences, corporate analysts' meetings, media conferences and other group events.

In the case of sessions of Congress and other governmental bodies, the timely delivery of the information content is particularly valuable. Many interested parties could benefit from prompt knowledge of pending provisions in legislation, rulings in court cases and other deliberations. For instance, individuals or organizations that would be affected by the enactment of pending legislation may want to furnish input to their representatives. Or constituents may want to take other actions to contribute or adjust to new statutory, regulatory or other programs.

The federal government deploys a host of communications facilities situated at a variety of sources, often issuing permits for access to those resources. For instance, the U.S. Congress permits press access to its chambers and hearing rooms, from which live video and audio feeds are generated for delivery to commercial networks, news and other organizations.

However, in the instance of legislative reporting, there is a particular demand for written records of the legislature's activities. Public and private organizations exist which take down and transcribe the activities of both chambers. Those Congressional transcripts are typically made available in hard copy or electronic format within about 48 hours from the time of the legislative sessions, for a subscription fee. This is in contrast to audio or visual feeds for network TV or other delivery, which are often contemporaneous with the debates and other activities. The media, the public, interest groups as well as the government bodies themselves would benefit from more timely and robust delivery of both live media and concurrent textual streams of the dialogue.

SUMMARY OF THE INVENTION

The invention relates to a system and method for the integrated delivery of media and synchronized transcription, in which a dedicated network collects, processes and delivers unified audio, video and textual content on a live basis to subscribers. In one regard, the invention may incorporate front-end audio or video servers which sense and collect the audible or video activities of a legislature, press conference, town meeting or other event.

The raw, digitized media feeds from the event are transmitted to a centralized distribution server, which in turn delivers the digitized stream of the event to a remote transcription facility, where automated and human transcription stages decode the dialogue taking place. After speech recognition and editing take place, the textual content is synchronized with the original audio, video or other media and delivered to subscribers, for instance via a Web site interface. Subscribers may configure the delivery modes according to their preference, for instance to silently parse the textual steam for key words, triggering full-screen, audible, wireless or other delivery of the audio or video content when a topic of interest is discussed.

The subscribers may alternatively choose to view and hear the media and textual output continuously, and may access archives for the purpose of reproducing text for research or editorial activities.

BRIEF DESCRIPTION OF THE DRAWINGS

The invention will be described with respect to the accompanying drawings, in which like elements are referenced by like numbers, and in which.

DETAILED DESCRIPTION OF PREFERRED EMBODIMENTS

Figure 1:
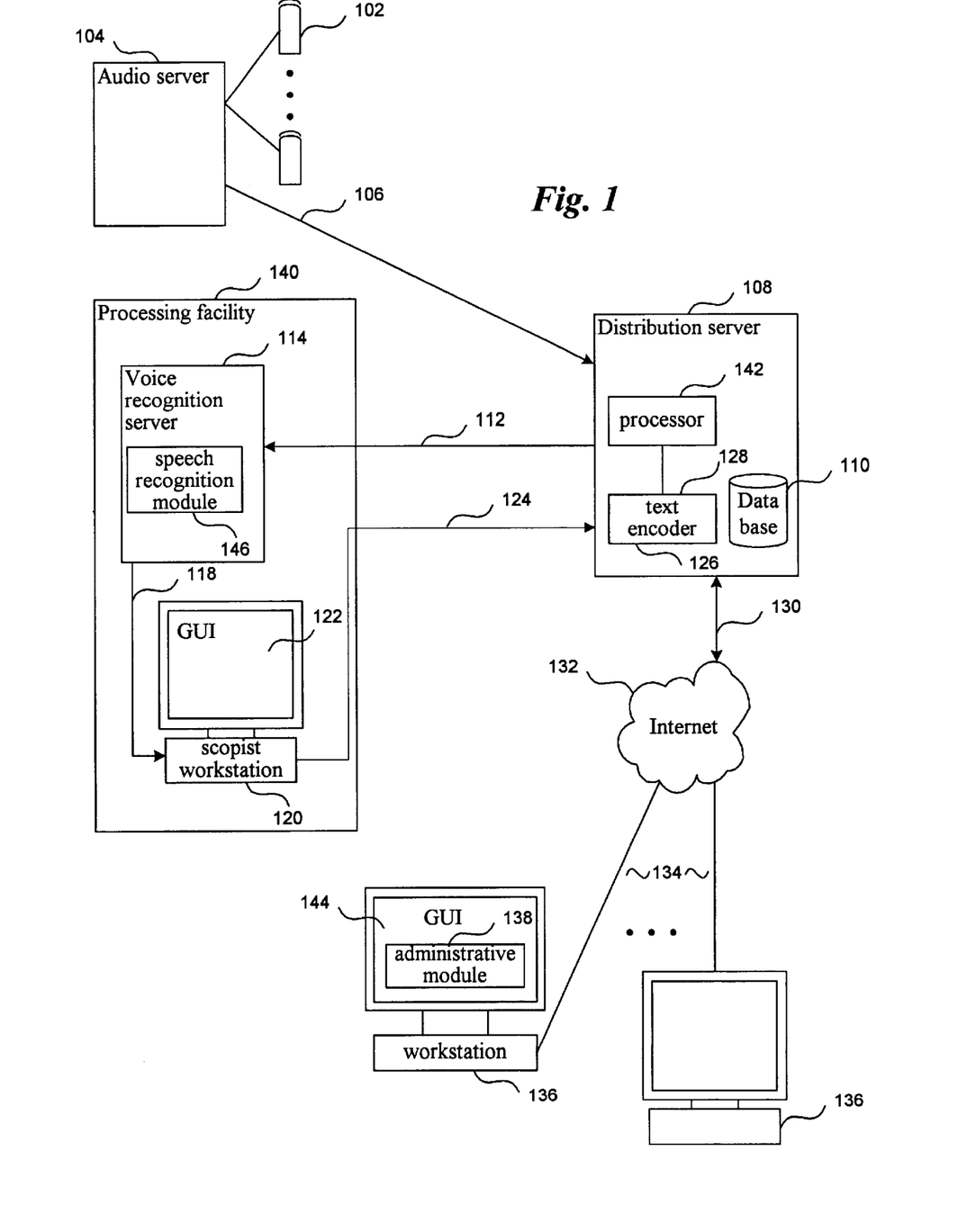
FIG. 1 illustrates an overall network architecture for delivery of media and text according to one embodiment of the invention.

The invention will be described with reference to an illustrative embodiment whose overall architecture is shown in FIG. 1. In this embodiment, a Congressional session or other event is intended to be recorded and delivered to public and other subscribers with a simultaneous textual stream. In the illustrative embodiment, a microphone array 102 is installed in a Congressional chamber, auditorium or other event site. The microphone array 102 is connected to an audio server 104 located at the event site.

The audio server 104 may be or include a computer workstation having one or more high-resolution audio digitizer boards along with sufficient CPU, memory and other resources to capture raw sounds and other data for processing in digital form. In one embodiment, the audio server 104 may use as an encoding platform the commercially available RealProducer™ software to produce a digitized audio stream.

In the embodiment illustrated in FIG. 1, after capture of the spoken words of the event, the resulting raw, digitized audio stream is transmitted over communications link 106 to a remote distribution server 108 acting as a distribution and processing hub. Communications link 106 joining the audio server 104 and the distribution server 108 may be or include any one or more of, for instance, the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections.

Communications link 106 may furthermore be or include any one or more of a WAP (Wireless Application Protocol)

link, a GPRS (General Packet Radio Service) link, a GSM (Global System for Mobile Communication) link, or other wired or wireless, digital or analog interfaces or connections.

Distribution server 108 incorporates a database 110 for the mass storage of synchronized collections of audio, video and textual information related to individual media events collected by one or more audio server 104 or other front-end sources. In one embodiment, such additional sources may include a portable text-scanning or OCR device such as the Hewlett-Packard CapShare™ to capture and transmit textual information such as press releases, schedules, transcripts or other data from the event site along with other media using infrared or other connections to communications link 106.

Distribution server 108 may be or include, for instance, a workstation running the Microsoft Windows™ NT™, Unix, Linux, Xenix, Solaris™, OS/2™, BeOS™, Mach, Apache, OpenStep™ or other operating system or platform software. In the illustrative embodiment of FIG. 1, the distribution server 108 directs the raw, digitized audio stream via communications link 112, which may be or include similar connections as communications link 106, to a processing facility 140.

Processing facility 140 may be a separate facility or other internal, local or remote engine dedicated to the transcription of the raw media input into character or other format, such as ASCII English or other textual or other forms. Processing facility 140 may incorporate a voice recognition server 114 to receive the digitized audio or other media streams for processing and conversion. The voice recognition server 114 may in one embodiment include one or more speech recognition module 146, such as the commercially available Dragon™ Professional or IBM ViaVoice™ product lines.

Speech recognition module 146 may preferably be capable of speaker-independent operation. Different or specialized versions of speech recognition module 146 may be employed within voice recognition server 114 to enhance accuracy, upgrade the functionality, or provide special foreign language or other features according to the transcription needs. The voice recognition server 114 may be attended by a human transcription agent to monitor and operate the speech recognition module 146 and other components, to ensure the smooth flow of first stage conversion from voice to text. In the practice of the invention, it may be advantageous to train the speech recognition module 146 with particular vocabulary words likely to be spoken at the event, before processing the media stream.

In another embodiment of the invention, the audio server 104, speech recognition module 146 and other elements may cooperate to recognize and split different voices or other audible sources into separate channels, which in turn are individually processed to output distinct textual streams.

The voice recognition server 114 thus invokes one or more speech recognition module 146 preferably with oversight or monitoring by a human transcription agent to resolve the digitized verbal content generated by the audio server 104 into a raw textual stream, for instance ASCII-coded characters. Output in other languages and formats, such as 16-bit Unicode output, is also possible. The role of the transcription agent may include the maintenance and operation of the speech recognition module 146, monitoring the raw textual stream and other service tasks. The transcription agent's role however is intended to be comparatively limited, and to generally not or not frequently involve semantic judgments or substantive modifications to the raw textual stream. It may be noted that the role of or need for the transcription agent may be reduced or eliminated in implementations of the invention, depending on the sophistication and accuracy of the speech recognition module 146, as presently known or developed in the future.

Once the initial conversion from original media is done, the raw textual stream may be delivered over local connection 118, such as an RS232 serial, FireWire™ or USB cable, to a scopist workstation 120, which may also be located within the processing facility 140 or elsewhere. The scopist workstation 120 may incorporate text editing software presented on a graphical user interface (GUI) 122 for review by a human editorial agent, whose role is intended to involve a closer parsing of the raw textual stream.

The tasks of the editorial agent illustratively stationed at scopist workstation 120 include review of the raw textual stream produced by the voice recognition server 114 to correct mistakes in the output of the speech recognition module 146, to resolve subtleties, foreign language phrases, to make judgments about grammar and semantics, add emphasis or other highlights and generally to increase the quality of the output provided by the invention. The editorial agent at the scopist workstation 120 may be presented with the capability, for instance, on the agent GUI 122 to stop/play/rewind the streaming digitized audio or other media in conjunction with the text being converted, to compare the audible event to the resulting text.

In one embodiment of the invention, compression technology known in the art may be employed to fast-forward the media and textual stream for editing or other actions while still listening to audible output at a normal or close to normal pitch.

In the practice of the invention, the editorial agent at scopist workstation 120 generally attempts to enhance textual accuracy to as close to 100% as possible. The invention also outputs the synchronized streams with as little lag time from event to reception as is possible, to provide an experience akin to a "live" television broadcast for the subscriber. However, in any implementation some degree of delay, including that resulting from processing time in the servers, network lag, and human response time of the transcriber, editorial agent or other attendants, is virtually inevitable. The total amount of delay from event to reception may vary according to the nature of the input, network conditions and other factors, but may generally be in the range of 15 minutes or less.

After all editorial corrections and enhancements are entered at the scopist workstation 120, the edited textual stream is delivered via communications link 124, which may likewise be or include a similar link to communications link 106, to a text encoder module 126 incorporated within the distribution server 108. The communications link 124 may also be or include, for instance, a Telnet connection initiated over the Internet or other network links.

The text encoder 126 receives the corrected textual stream and converts the stream into, in an illustrated embodiment, a RealText™ stream adhering to the commercially known Real standard for further processing. The converted Real-Text™ stream may be transmitted via connection 128, which may be, for instance, a 100baseT connection to processor 142. The finished, edited, corrected, converted RealText™ stream representing the audible or other events being transcribed is then sent to distribution server 108, synchronized and stored in database 110 with the raw digitization of the media from the event, for delivery to subscribers.

The synchronization may be implemented, for instance, using the WallClock function of the commercially available Real software. The Wall Clock function allows multiple media streams to be synchronized using internal timestamps encoded into each stream. As the streams are received on the client or recipient side, they are buffered until all streams are at the same internal time to each other. Once the streams are aligned in time using timestamp and other information, the player within the client workstation 136 may start playing the streams simultaneously. The distribution server 108 may store the finished composite stream or portions thereof in database 110 in RealText™ or a variety of other formats, for instance in XML, HTML, ASCII, WAV, AIFF, MPEG, MP3, Windows™ Media or others.

The arrival of an illustrative finished RealText™ or other stream into the database 110 may trigger a start code which releases the synchronized media and processed textual streams for delivery to subscribers to the service of the invention over dissemination link 130. Dissemination link 130 may, again, be or include a similar link to communications link 106, such as a single or multiple digital T1 or other communications channel.

Dissemination link 130 may furthermore be or include a Personal Area Network (PAN), a Family Area Network (FAN), a cable modem connection, an analog modem connection such as a V.90 or other protocol connection, an Integrated Service Digital Network (ISDN) or Digital Subscriber Line (DSL) connection, a BlueTooth wireless link, a WAP (Wireless Application Protocol) link, a Symbian™ link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, an IEEE 802.11-based radio frequency link, or other wired or wireless links.

Dissemination link 130 illustratively includes TCP/IP connections over the Internet 132 to one or more subscriber connection 134, which in turn may be or include links similar to communications link 106, for delivery to one or more client workstation 136. In one embodiment, any one or more of communications link 106, communications link 112, communications link 124, communications link 130, communications link 134 or other communications links may be or include self-healing or self-adjusting communication sockets that permit dynamic allocation of bandwidth and other resources according to local or global network conditions.

The client workstation 136 may be or include, for instance, a personal computer running the Microsoft Windows™ 95, 98, 2000, Millenium™, NT, Windows CE™, Palm™ OS, Unix, Linux, Solaris™, OS/2™, BeOS™, MacOS™ or other operating system or platform. Client workstation 136 may also be or include any microprocessor-based machine such as an Intel x86-based device or Motorola 68K or PowerPC device, microcontroller or other general or special purpose device operating under programmed control.

Client workstation 136 may furthermore include electronic memory such as RAM (random access memory) or EPROM (electronically programmable read only memory), storage such as a hard drive, CDROM or rewriteable CDROM or other magnetic, optical or other media, and other associated components connected over an electronic bus (not shown), as will be appreciated by persons skilled in the art.

In the modem pervasive computing environment client workstation 136 may also be or include a network-enabled appliance such as a WebTV™ unit, radio-enabled Palm™ Pilot or similar unit, a set-top box, a game-playing console such as Sony Playstation™ or Sega Dreamcast™, a browser-equipped cellular telephone, other TCP/IP client or other wireless appliance or other communication device.

The combined, synchronized media and finished textual stream arriving over subscriber link 134 from database 110 may be viewed on a client GUI 144 in conjunction with an administrative module 138 running on the client workstation 136 permitting authentication of subscribers, access to and manipulation of the information content delivered by the invention. More particularly, a subscriber may use the client GUI 144 on client workstation 136 to invoke or log into a Website for their information subscription, and enter password and other information to view the synchronized output stream according to their delivery preference. Schedules of different types of media events, in searchable database or other form, may in another embodiment be presented on the client GUI 144 to assist in event selection.

For instance, the subscriber may choose to view the entire information stream produced by the invention, including audio, video and synchronized textual output on client GUI 144 using speakers 148, headphones and other output devices for further review.

Conversely, the subscriber may enter commands using administrative module 138 and client GUI 144 to have the information stream delivered silently or in a background process, with an alert function activated. The alert function may scan the incoming textual stream at the point of the distribution server 108 or client workstation 136 for the presence of key words chosen by a subscriber, upon the detection of which a full screen may pop up showing the surrounding text, video or other content. Alternatively, upon detection of a keyword the alert function may deliver other information such as a message or notice via e-mail, an Inbox message in Microsoft Outlook™, an online instant message, an IRC (Internet Relay Chat) message or other electronic bulletin.

In another embodiment, the user may choose to receive the informational content in a silent mode while viewing the entire textual stream, but with the ability to highlight portions of the textual stream to then hear the audio output associated with that portion. This, for instance, may be useful for a subscriber wishing to discern emphasis, inquiry, irony or other inflections or subtleties that may not be evident in textual form.

A subscriber operating the client workstation 136 may likewise choose to highlight, cut, paste, stream to hard or removable drive or otherwise store or archive one or more portions of the information content delivered by the invention for later processing, word processing, retransmission or other uses. In another regard, subscriber access via the subscriber links 134 may permit a Website or other entry portal to allow a subscriber to access prior news events for archival or research purposes. Likewise, the subscriber may manipulate administrative module 138 to schedule the delivery of the streaming service of the invention according to specified dates and times, events of interest and associated delivery modes, and other settings.

Figure 2:
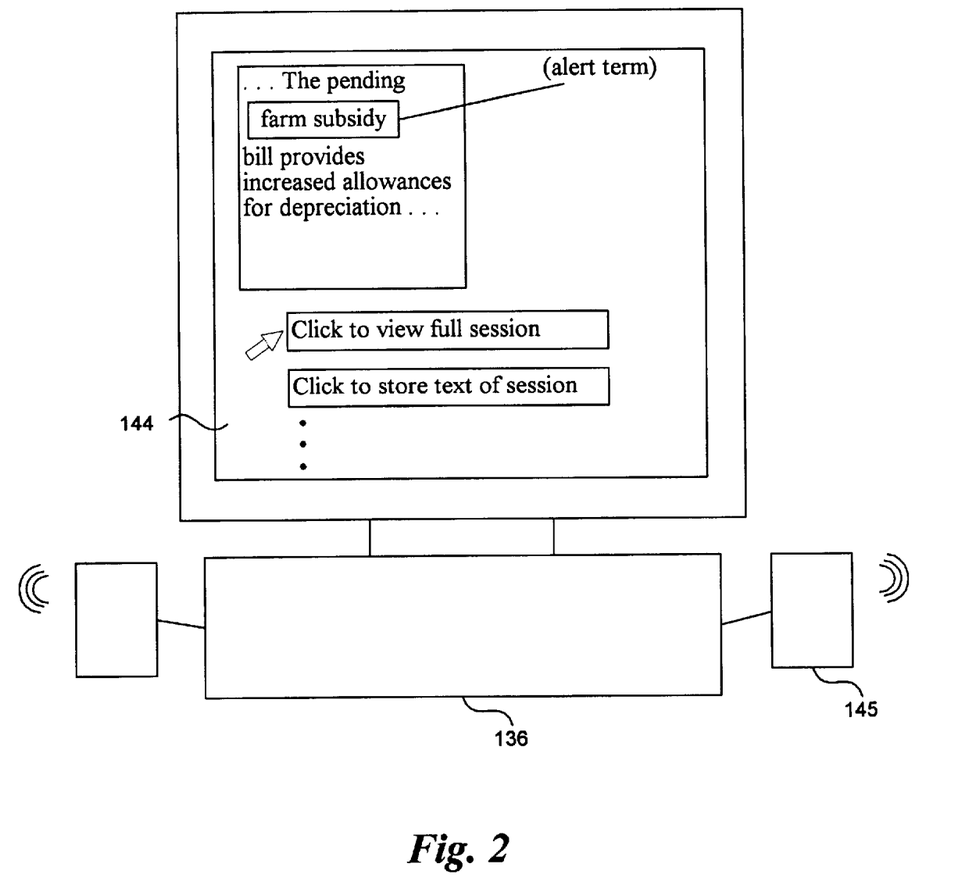
FIG. 2 illustrates an example of a subscriber interface used to view the output produced by the invention.

In this respect, database 110 within distribution server 108 may be configured to be searchable according to discrete search terms, particular fields related to header descriptions of the event, or on other bases. In this regard the database 110 may be configured with a decision support or data mining engine to facilitate the research functions. An example of subscriber choices for manipulating the client GUI 144 and associated administrative choices is illustrated in FIG. 2.

Figure 3:
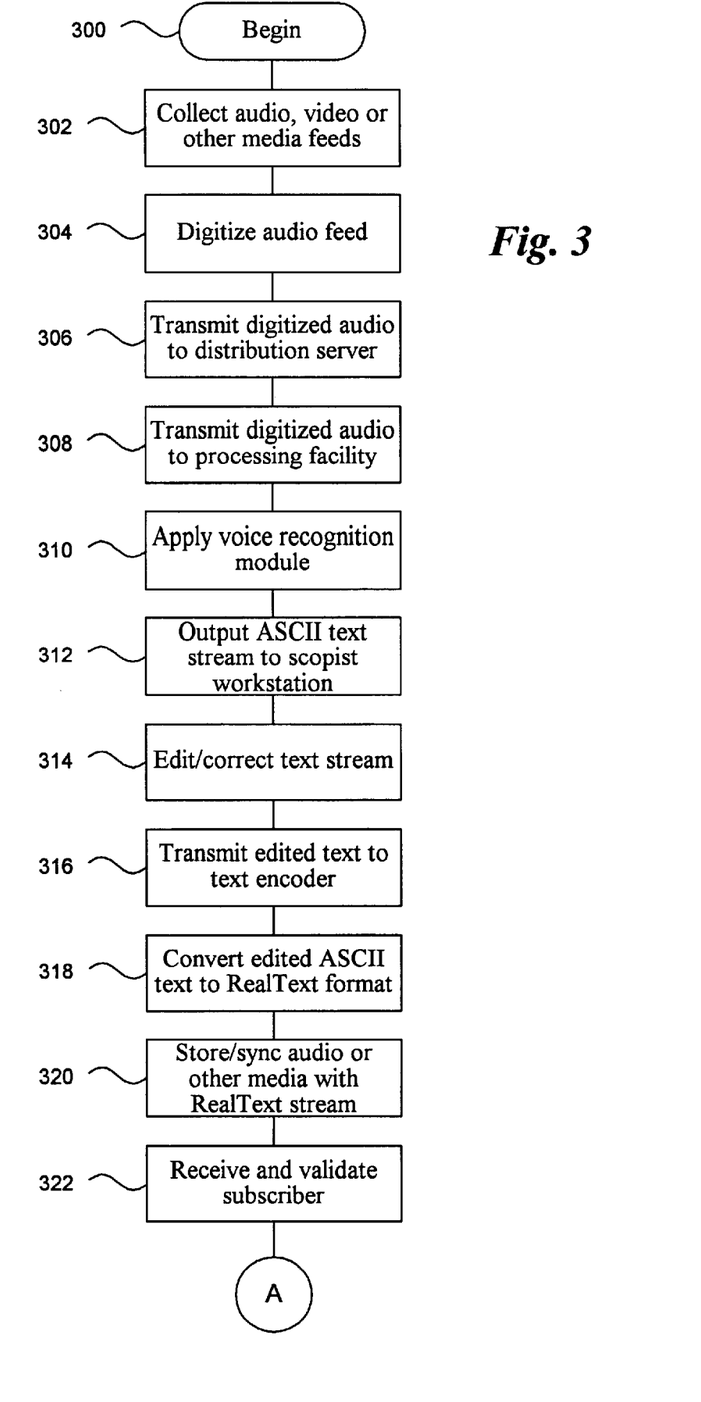
FIGS. 3 and 4 illustrate a flowchart of media and textual processing according to the invention.
Figure 4:
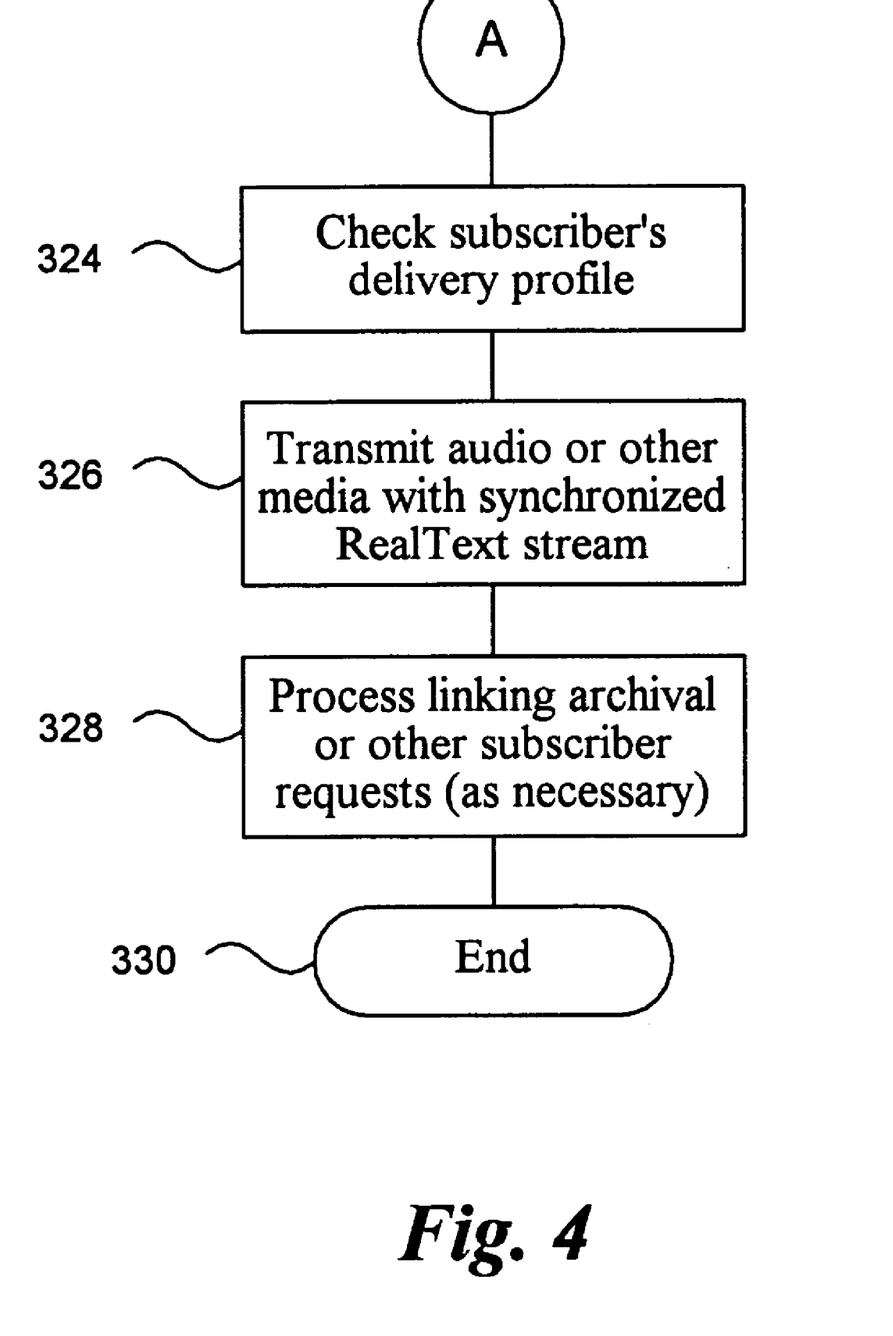

General media and translation processing according to the invention will be described with reference to the flowchart of FIGS. 3 and 4. In step 200, processing begins. In step 202, audio or other input from an event is collected and delivered to audio server 104. In step 204, the raw audio, video or other signals are digitized. In step 206, the digitized audio data is transmitted to the distribution server 108. In step 208, the digitized audio stream, in RealAudio™ format, or otherwise, is transmitted to the processing facility 140. In step 210, speech recognition module 146 is invoked to output an ASCII text or other stream corresponding to the audio content.

In step 212, the ASCII text stream is output to the scopist workstation 120. In step 214, the ASCII text stream is edited by an editorial agent at the scopist workstation 120 using the agent GUI 122. In step 216, the edited or corrected textual stream is transmitted to the text encoder module 126. In step 218, the corrected or edited ASCII text is converted to an advanced text format, such as RealText™.

In step 220, the reformatted textual stream is stored and synchronized with the audio or other media source within database 110. The integrated media/textual information is now prepared for subscriber access. In step 222, one or more subscribers access the distribution server 108 and are validated for use. In step 224, the subscriber's delivery profile is checked to set delivery mode, such as full streaming content, background execution while searching for alert terms, or other formats or modes.

In step 226, the integrated audio or other media along with the textual stream is delivered according to the subscriber's service profile, whether triggering an alert or other mode. In step 228, subscriber requests for archival linking to related sources or other non-streaming services may be processed as desired. In step 230, processing ends.

The foregoing description of the system and method for integrated delivery of media and synchronized transcription is illustrative, and variations in configuration and implementation will occur to persons skilled in the art. For instance, while the processing facility 140 has been illustrated in terms of single remote site handling all of the streaming media content distributed by the distribution server 108, transcription and other processing services could be distributed to a variety of locations having different computing, communications and other resources. For further instance, the finishing and synching of the integrated text and media stream could be executed within the processing facility 140 when provisioned with sufficient processing, storage and other resources. Furthermore, an event site could have one or more audio server 104 or other front-end capture facility to process source media. Moreover multiple events could be processed at the same time, to generate a combined output stream. The scope of the invention is accordingly intended to be limited only by the following claims.

What is claimed is:

1. A system for generating synchronized media and textual streams, the system comprising:
   a first interface to at least one streaming media source;
   a distribution server in communication with the first interface, the distribution server storing the media stream; and
   a second interface in communication with the distribution server and a transcription engine, said transcription engine receiving the media stream and producing a textual stream corresponding to the media stream and outputting said textual stream to said distribution server,
   wherein said distribution server synchronizes said textual stream with said stored media stream and produces a combined media and textual stream, and
   wherein said distribution server outputs said combined media and textual stream to a recipient such that the recipient can observe said combined media and textual stream on a synchronized and simultaneous basis.

2. The system of claim 1, wherein the at least one streaming media source comprises an audio server outputting digitized audio to the first interface.

3. The system of claim 1, wherein the distribution server comprises a database for storing the media stream and the textual stream, and the distribution server synchronizes the textual stream and the media stream for storage in the database.

4. The system of claim 1, wherein the transcription engine comprises a voice recognition server executing a speech recognition module outputting a raw transcription stream, the voice recognition server presenting the raw transcription stream to a transcription agent to monitor the generation of the raw transcription stream.

5. The system of claim 4, wherein the transcription engine comprises a scopist workstation, the scopist workstation receiving the raw transcription stream from the voice recognition server and presenting the raw transcription stream to an editorial agent to edit and output as the textual stream.

6. The system of claim 1, wherein the combined media and textual stream is output to the recipient at a client workstation.

7. The system of claim 6, wherein the combined media and textual stream is output via an Internet connection.

8. The system of claim 7, wherein the client workstation comprises an administrative module, the administrative module managing the delivery of the combined media and textual stream to the recipient.

9. The system of claim 8, wherein the administrative module comprises delivery configurations, the delivery configurations comprising at least one of full delivery of the combined media and textual stream, background delivery of the combined media and textual stream, scheduling of the delivery of the combined media and textual stream, delivery of an alert based upon detection of a keyword in the textual stream, and delivery of the combined media and textual stream based upon detection of a keyword in the textual stream.

10. The system of claim 1, wherein the at least one streaming media source comprises a video server outputting digitized video to the first interface.

11. The system of claim 1, wherein the textual stream comprises textual output in a plurality of languages.

12. The system of claim 1, wherein the textual stream comprises textual output corresponding to a plurality of speakers.

13. The system of claim 12, wherein the textual stream comprises a plurality of channels, each corresponding to one of the speakers.

14. A method of generating synchronized media and textual streams, comprising:
   a) receiving a media stream from at least one streaming media source;
   b) storing the media stream in a distribution server;
   c) outputting the media stream to a transcription engine;
   d) generating a textual stream corresponding to the media stream in the transcription engine;
   e) synchronizing the media stream with the textual stream;

f) producing a combined media and textual stream; and g) outputting the combined media and textual steam to a recipient.

15. The method of claim 14, wherein the at least one streaming media source comprises an audio server outputting digitized audio.

16. The method of claim 14, wherein the distribution server comprises a database for storing the media stream and textual stream and wherein the step (e) of synchronizing the media stream and the textual stream is performed by the distribution server for storage in the database.

17. The method of claim 14, wherein the transcription engine comprises a voice recognition server, further comprising a step of (h) executing a speech recognition module on the voice recognition server and outputting a raw transcription stream, the voice recognition server presenting the raw transcription stream to a transcription agent to monitor the generation of the raw transcription stream.

18. The method of claim 17, wherein the transcription engine comprises a scopist workstation, further comprising a step of (i) receiving the raw transcription stream from the voice recognition server in the scopist workstation and presenting the raw transcription stream to an editorial agent to edit and output as the textual stream.

19. The method of claim 14, wherein the combined media and textual stream is output to the recipient at a client workstation.

20. The method of claim 19, wherein the combined media and textual stream is output via an Internet connection.

21. The method of claim 20, wherein the combined media and textual stream are received at the client workstation, the client workstation comprising an administrative module, further comprising a step of (j) managing the delivery of the combined media and textual stream to the recipient using the administrative module.

22. The method of claim 21, wherein the step (j) of managing comprises a step of using the administrative module to set delivery configurations, the delivery configurations comprising at least one of full delivery of the combined media and textual stream, background delivery of the combined media and textual stream, scheduling of the delivery of the combined media and textual stream, delivery of an alert based upon detection of a keyword in the textual stream, and delivery of the combined media and textual stream based upon detection of a keyword in the textual stream.

23. The method of claim 14, wherein the at least one streaming media source comprises a video server outputting digitized video to the first interface.

24. The method of claim 14, wherein the textual stream comprises textual output in a plurality of languages.

25. The method of claim 14, wherein the textual stream comprises textual output corresponding to a plurality of speakers.

26. The method of claim 25, wherein the textual stream comprises a plurality of channels, each corresponding to one of the speakers.

* * * * *